United States Patent [19]

Zulawski

[11] Patent Number: 5,029,664
[45] Date of Patent: Jul. 9, 1991

[54] FRONT SUSPENSION SYSTEM FOR A SNOWMOBILE

[75] Inventor: Dennis P. Zulawski, St. Hilaire, Minn.

[73] Assignee: Arctco, Inc., Thief River Falls, Minn.

[21] Appl. No.: 491,517

[22] Filed: Mar. 12, 1990

[51] Int. Cl.$^5$ ............................................. B62M 27/02
[52] U.S. Cl. .................................. 180/190; 280/21.1
[58] Field of Search ................. 280/21.1, 22.1, 673, 280/675, 691; 180/183, 190

[56] References Cited

U.S. PATENT DOCUMENTS

| 3,827,516 | 8/1974 | Lucia | 180/190 |
| 3,883,152 | 5/1975 | de Carbon | 280/675 |
| 3,884,314 | 5/1975 | Callaway | 280/21.1 |
| 3,912,030 | 10/1975 | Payne | 280/21.1 |

Primary Examiner—Charles A. Marmor
Assistant Examiner—Mitchell Bompey
Attorney, Agent, or Firm—Jerold M. Forsberg; James E. Olds

[57] ABSTRACT

A suspension system for the skis of a snowmobile controls the movement of a projected steering point associated with each ski such that the steering points move substantially parallel to a vertical plane containing the longitudinal axis of the snowmobile during deflection of the suspension system. The linkage for each ski includes a spindle arrangement, the chassis, an upper suspension linkage, and a lower suspension linkage.

14 Claims, 3 Drawing Sheets

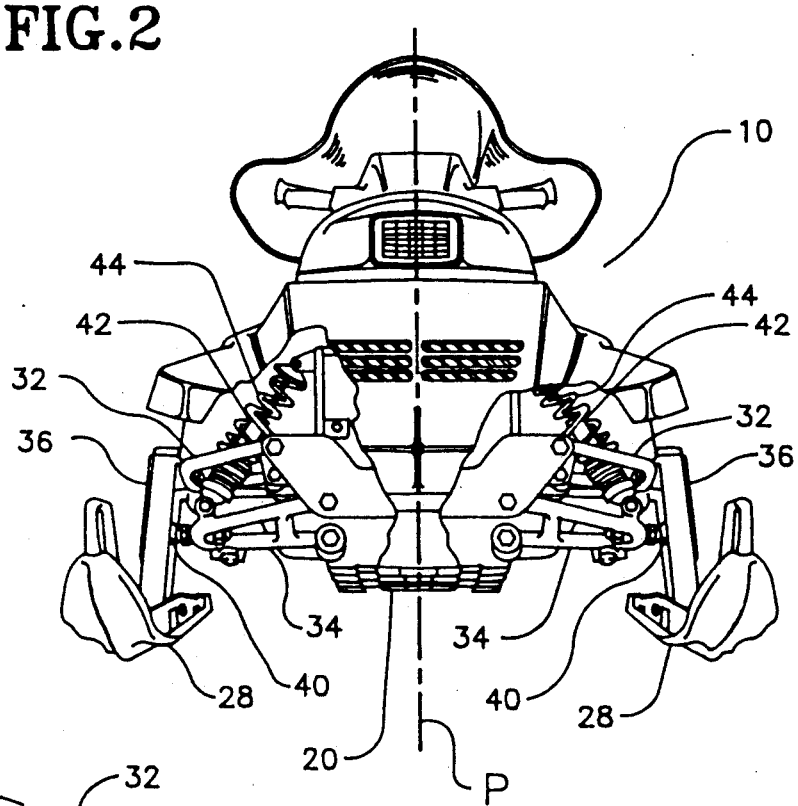
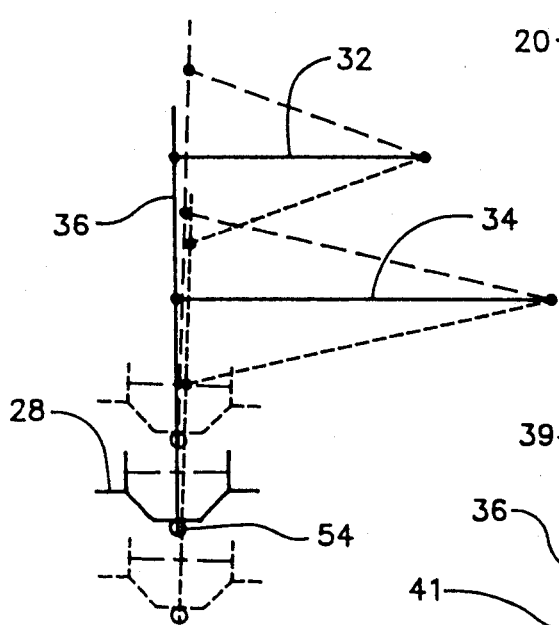
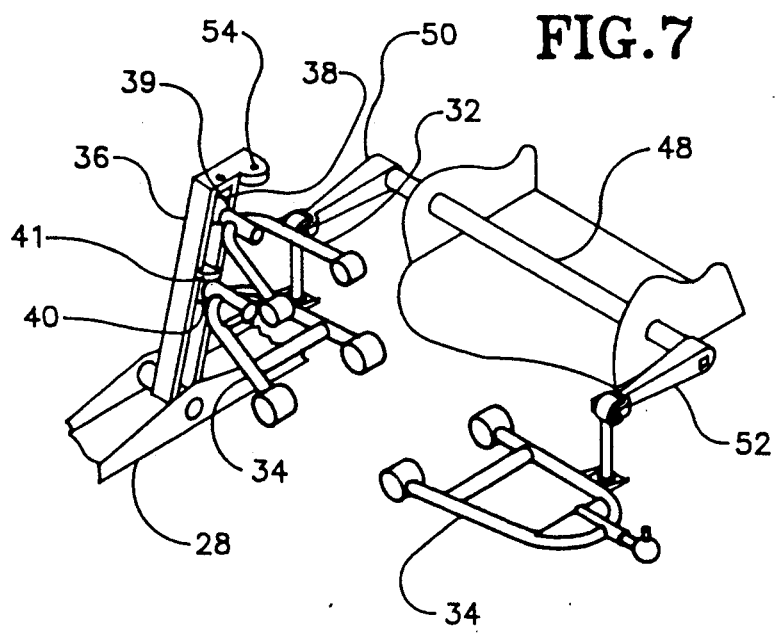

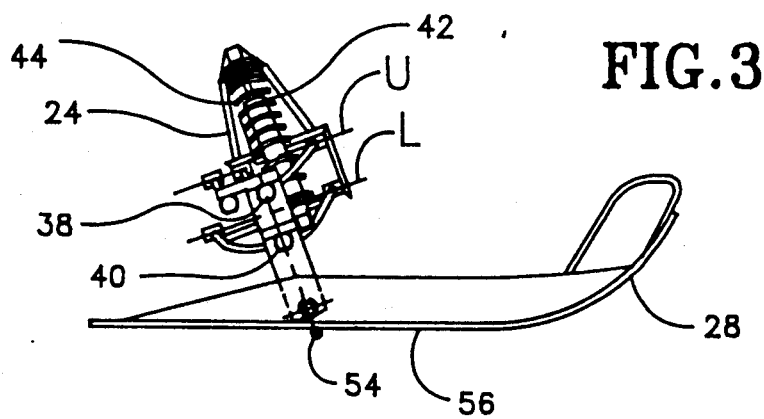
FIG. 3
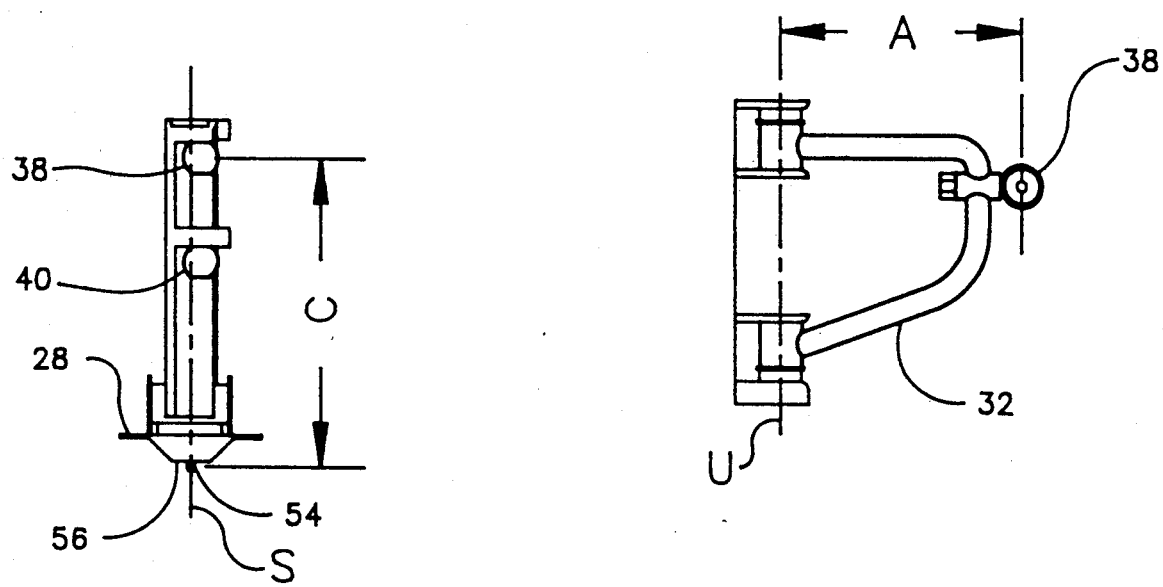
FIG. 4
FIG. 6
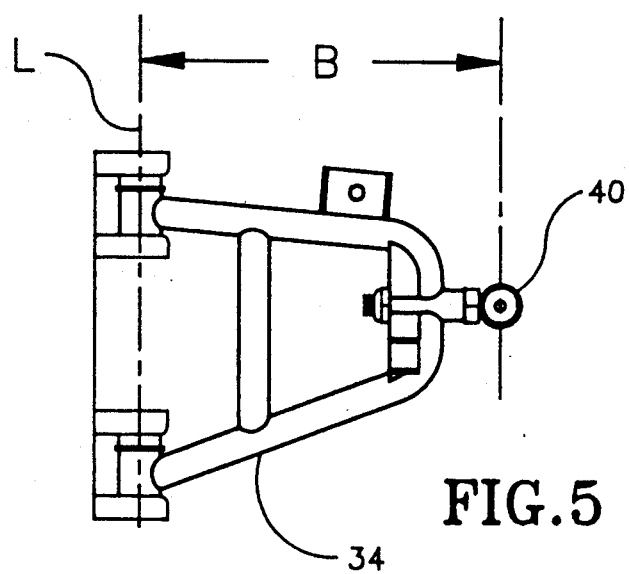
FIG. 5

FRONT SUSPENSION SYSTEM FOR A SNOWMOBILE

BACKGROUND OF THE INVENTION

The present invention relates generally to an improved front suspension system for a snowmobile, and more specifically to a suspension system connecting skis to the chassis of a snowmobile in such a manner that lateral movement of the skis relative to the chassis during deflection of the suspension system is substantially eliminated.

Snowmobiling has changed dramatically during the last decade and more sophisticated approaches to old problems are needed. One problem that has been around for a long time and which has become more of a concern now that more of the new snowmobiles are capable of speeds over 100 mph is the quick lateral movements of the snowmobile which are induced by the front suspension reacting to undulations in the terrain. At high speed this can be a very disconcerting feeling for a rider or passenger and may be accentuated by conditions such as when bumps are encountered during the traversing of a hillside at high speed.

Snowmobiles are generally designed to have either a single rider or two riders with one rider sitting in front of the other rider and driving the snowmobile. The driver is usually an active participant and is reacting to the terrain along with the snowmobile where, however, the rider is usually unable to see the trail as clearly as the driver and often times is surprised by quick lateral movements of the snowmobile. Riding at night or in conditions in which visibility is limited may also result in the driver being surprised by an imperfection in the trail and the suspension causing a quick lateral movement. The instant invention approaches this problem and eliminates undesirable lateral shifting of the snowmobile induced by a front suspension geometry that laterally shifts the skis relative to the chassis during suspension travel, thereby providing a more comfortable and safer ride.

Prior to the instant invention, the prior art has taken a number of different approaches to snowmobile front suspensions. One approach, depicted in U.S. Pat. No. 4,489,954, shows a strut-type suspension for controlling movement of a ski relative to the chassis. This type of system has found extensive usage in automobiles, but some shortcomings have become apparent when it is used on a snowmobile because of the rough terrain and severe conditions in which snowmobiles are often used. One problem being the cost of replacement struts when they are damaged.

Some prior art types of suspension systems have not recognized the problem or at least not openly dealt with the problem. One typical prior art suspension includes a leaf-type spring attached to a ski and to a steering spindle near its midpoint, such an arrangement is depicted in U.S. Pat. No. 3,920,091. Another prior art suspension system, depicted in U.S. Pat. No. 3,140,752, shows a pair of equal length arms 3 and 4 forming a parallelogramic linkage for supporting skis laterally disposed relative to a chassis. The skis in this arrangement follow an arc during deflection of the suspension. Yet another prior art suspension system, depicted in U.S. Pat. No. 3,884,314, shows an upper suspension bracket 46 and a lower suspension member 58 supporting a spindle 36 which in turn is attached to a ski 16. Some of the suspension components of this arrangement have very basic similarities to the instant invention. However, this arrangement fails to teach the concept or show the end result of the present invention. U.S. Pat. No. 4,082,155 shows a wheeled undercarriage for a snowmobile which includes a pair of suspension members 92 and 96 which are attached to a support bracket 100 by upper and lower ball joints 102 and 104. Bracket 100 of this device has a horizontally extending spindle to which a wheel assembly is attached. Finally, a prior art device, shown in U.S. Pat. No. 4,671,521, includes a control arm 34 cooperating with upper and lower suspension arms 36 and 37, respectively, for controlling movement of spindle 18 relative to the snowmobile chassis.

No where in any of the prior art devices is there found any teaching of an improved front suspension system as taught by the instant invention.

SUMMARY OF THE INVENTION

The present invention is part of an overall inventive suspension which is further described in my two copending applications Ser. No. 491,515 and Ser. No. 491,990, filed on the same date as this application. One of the copending applications is directed to a coordinated suspension for a snowmobile while the other is directed to a spindle arrangement for a snowmobile.

The present invention involves a snowmobile having an elongated chassis with a traction unit which is of the endless belt type disposed below and at the rear of the chassis. The front end of the chassis carries the engine and is supported by a pair of steerable skis suspended relative to the chassis.

In accordance with the present invention, an improved suspension system is provided for supporting the chassis of a snowmobile on skis, and more particularly a suspension system with a geometry which includes upper and lower suspension linkages of predetermined lengths in cooperation with a spindle of a predetermined length for eliminating lateral movement of the skis during suspension travel. The respective linkages and spindles are interconnected by ball joints at predetermined locations in such a manner that during deflection of the suspension system a ski attached to the lower end of the spindle moves substantially in a line parallel to a vertical plane which contains the longitudinal axis of the snowmobile. Controlling the lateral movement of the ski relative to the chassis during suspension travel eliminates the quick lateral movements of the chassis. An additional feature of the invention is that the camber of the skis is never negative during suspension travel. Accordingly, this disconcerting movement is eliminated by the improved suspension system of the present invention thereby providing the rider with a much more comfortable and safer ride.

Accordingly, it is an object of the present invention to provide a front suspension system for a snowmobile which substantially eliminates lateral movement of the skis relative to the chassis of the snowmobile during deflection of the suspension system.

Other objects and advantages of the present invention will be apparent and understood from the following detailed description when taken in conjunction with the accompanying drawings.

BRIEF DESCRIPTION OF THE DRAWINGS

A front suspension system for a snowmobile constructed in accordance with this invention is described

Figure 1:
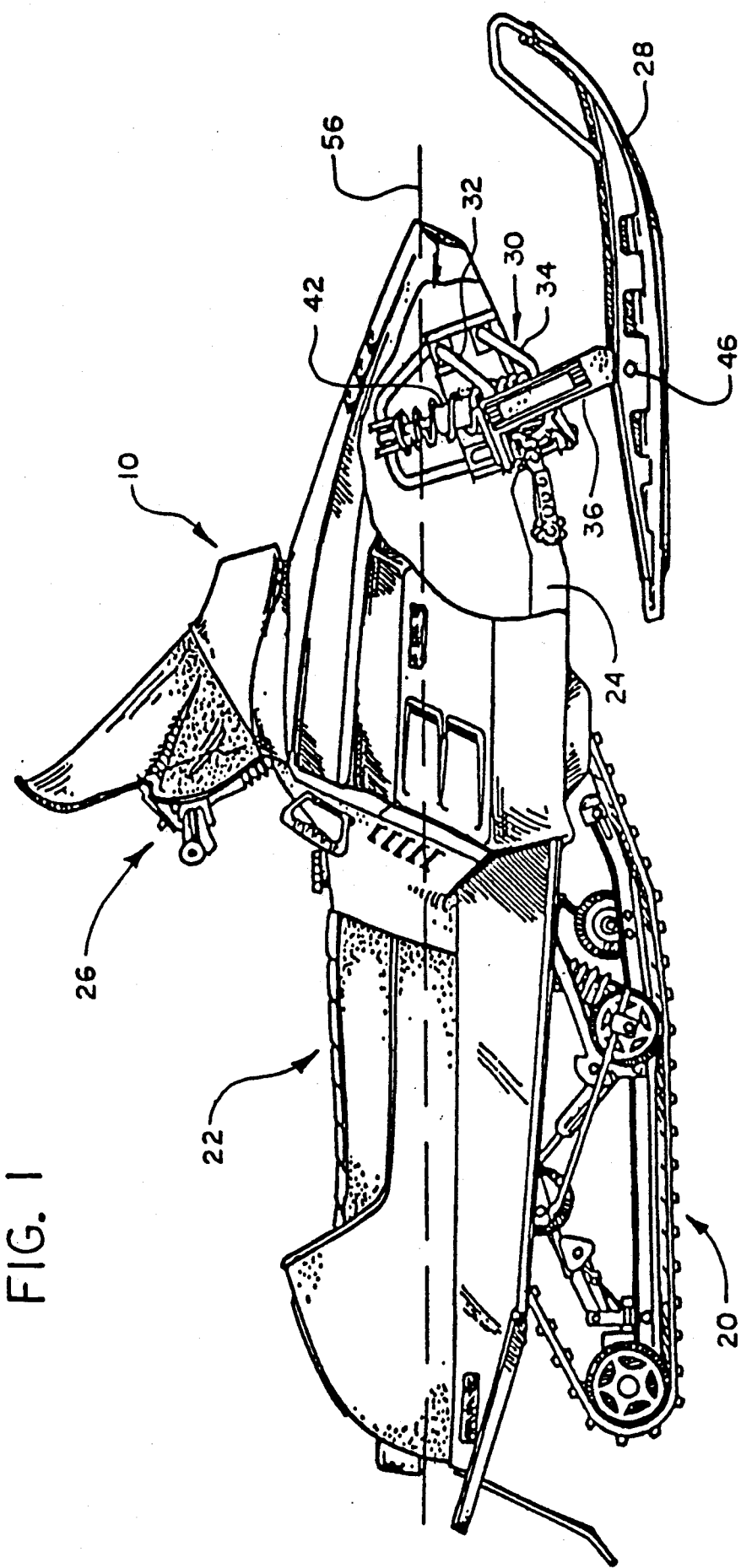

3 herein below with reference to the accompanying drawing, wherein:

FIG. 1 is a side view of a snowmobile with an improved front suspension constructed in accordance with the instant invention, a portion of the hood having been cut away to more fully illustrate the front suspension;

FIG. 2 is a front view of the snowmobile as seen in FIG. 1 with portions of the hood broken away to better illustrate the front suspension for each of the front skis;

FIG. 3 is a partial perspective view of the improved front suspension system for one side of the snowmobile;

FIG. 4 is a detailed plan view of the upper A-frame;

FIG. 5 is a detailed plan view of the lower A-frame;

FIG. 6 is a simplified front view of the spindle with a portion of the spindle broken away to show the ball joints;

FIG. 7 is a partial perspective view of portions of the front suspension system in accordance with the instant invention showing the relationship of the shown components to the sway bar and a portion of the chassis; and FIG. 8 is a simplified depiction of the improved suspension system of the instant invention showing the relative movement of the steering point.

DETAILED DESCRIPTION OF THE PREFERRED EMBODIMENT

It should be noted that like reference numerals are used throughout the various views to designate similar elements or components.

Referring now to FIGS. 1 and 2, a snowmobile 10, of the type having a forwardly mounted engine (not shown), is depicted as having a traction unit 20, a seat area 22, a chassis 24, a steering arrangement 26, a pair of steerable front skis 28, and an improved front suspension system 30 for the attachment and support of the snowmobile chassis 24 relative to the skis 28.

For ease of understanding, only one side of the front suspension will be discussed in detail. It being understood that the other side is a mirror image of the side being discussed.

Front suspension 30 includes a linkage arrangement including an upper linkage 32 generally referred to as an upper A-frame and a lower linkage 34 generally referred to as a lower A-frame. Upper and lower A-frames 32, 34 interconnect chassis 24 of snowmobile 10 to spindle 36 which in turn has a ski 28 attached to the lower end thereof.

Referring now to FIGS. 3 and 7, upper A-frame 32 is attached to chassis 24 by bushings (not shown) in a manner such that the upper A-frame 32 is pivotable about an inclined axis "U". Lower A-frame 34 is pivotably attached to chassis 24 by bushings (not shown) and is pivotable about an inclined axis "L". Upper A-frame 32 and lower A-frame 34 are substantially parallel to one another and are attached to spindle 36 by ball joints 38, 40, respectively, which in turn are attached to transverse webs 39, 41 formed as part of the spindle 36. Spindle 36 has a longitudinal axis "S" which along with spindle 36 is inclined forwardly and downwardly in the direction of forward travel of the snowmobile 10. Shock absorber 42 with an encircling spring 44 interconnects chassis 24 with lower A-frame 34 and spindle 36 has ski 28 attached to the free end thereof by a pivot pin 46.

Shock absorber 42 is for dampening movement of ski 28 relative to the chassis 24 and for the transference of weight from the snowmobile 10 to the skis 28. A sway bar 48 is mounted by bushings (not shown) to chassis 24 and arms 50, 52 interconnect the ends of the sway bar 48 to respective lower A-frames 34. Steering arrangement 26 includes tie rods connected to each of the spindles at 54 respectively for coordinating the steering of the skis 28 as a unit.

Referring now to FIGS. 4, 5, and 6, A-frame 32 is seen in FIG. 4 as having a length dimension "A" and lower A-frame 34 is seen in FIG. 5 as having a length dimension "B", the length dimension of the A-frame 32 being less than the length dimension of the A-frame 34. The length dimension of each of these A-frames is a predetermined amount for reasons which will become more apparent herein below. Spindle 36 as seen in FIG. 6, has a length dimension such that the distance from the point of attachment of the upper A-frame 32, i.e. the ball joint for the upper A-frame, to a steering point 54 at the bottom 55 of the ski 28 is "C". The steering point 54 is the point which is established by the projection of the longitudinal axis "S" of the spindle 36 through to the bottom 55 of ski 28.

It has been determined that when upper A-frame 32 is attached at a predetermined location on spindle 36 and lower A-frame 34 is attached at a predetermined location on spindle 36 with upper and lower A-frames 32, 34 having predetermined lengths and the distance from the connection of upper A-frame 32 to the spindle 36 to the steering point 54 on the bottom 55 of ski 28 is a predetermined amount, a suspension geometry results which maintains the steering point 54 at a substantially equal distance from a vertical plane "P", which includes the longitudinal axis 56 of snowmobile 10, when the suspension deflects either upwardly or downwardly. As seen in FIG. 8, when simplified upper A-frame 32 and lower A-frame 34 are attached to spindle 36, which in turn is attached to ski 28, as taught by the instant invention, the steering point moves substantially parallel to the vertical plane "P". The solid line configuration is the normal at rest position with the up and down deflection of the suspension shown in dashed lines. It should also be noted that as the suspension deflects either up or down that the camber of the ski is increased. This is preferred to an increase in negative camber for reasons of stability.

Accordingly it should be readily apparent that a snowmobile incorporating the concepts of the improved front suspension system of the instant invention will no longer have the quick lateral movements relative to the line which is the direction of travel due to suspension deflections. Accordingly, a rider using the snowmobile will have a greater degree of confidence and will appreciate a more comfortable and safer ride.

It should be understood that other forms of the improved suspension system are contemplated by the present invention and that numerous modifications may be made by those of skill in the art without departing from the scope and spirit of the invention.

I claim:

1. A front suspension system for a snowmobile having a chassis with a powered endless belt traction unit and a pair of forwardly mounted steerable skis attached to the chassis by the front suspension system, the snowmobile having a longitudinal axis, the improvement comprising:

a pair of spindles, each spindle being of a predetermined length and having a lower end pivotally attached about a transverse axis to one of said skis, each ski having a steering point on its bottom;

a pair of upper suspension linkages, each upper suspension linkage being of a predetermined length and having an outer end universally attached to a spindle at a first predetermined location and an inner end pivotally attached to the chassis so as to be rotatable about a first inclined axis; and a pair of lower suspension linkages, each lower suspension linkage being of a predetermined length and having an outer end universally attached to a spindle at a second predetermined location and an inner end pivotally attached to the chassis so as to be rotatable about a second inclined axis; whereby respective upper and lower suspension linkages cooperate with each respective spindle and said chassis to form a linkage arrangement, each respective linkage arrangement controlling movement of the steering point on each respective ski, during deflection of the suspension system wherein movement of the respective steering points is substantially parallel to a vertical plane containing the longitudinal axis of the snowmobile.

2. A front suspension system according to claim 1 wherein:
said upper and lower suspension linkages are A-frames of unitary and rigid construction.

3. A front suspension system according to claim 2 wherein:
the length of each upper A-frame is less than the length of each lower A-frame.

4. A front suspension system according to claim 3 wherein:
respective upper and lower A-frames are disposed so as to be parallel thereby forming along with a respective spindle and the chassis a parallelogramic linkage, said first inclined axis and said second inclined axis for each respective upper and lower A-frame being substantially parallel.

5. A front suspension system according to claim 4 wherein:
the first inclined axis and second inclined axis of respective upper and lower A-frames are substantially perpendicular to the longitudinal axis of a respective spindle.

6. A front suspension system according to claim 5 wherein:
the longitudinal axis of the spindle is inclined at substantially 20 degrees to the vertical, said longitudinal axis extending downwardly and forwardly in the direction of forward travel of the snowmobile.

7. A front suspension system according to claim 3 wherein:
the universal attachment of the upper and lower A-frames to each respective spindle is by a ball joint.

8. A front suspension system according to claim 7 wherein:
the pivotal attachment of the A-frames to the chassis is by bushings.

9. A front suspension system according to claim 6 wherein:
the universal attachment of the upper and lower A-frames to each respective spindle is by ball joints.

10. A front suspension system according to claim 9 wherein:
the pivotal attachment of the A-frames to the chassis is by bushings.

11. A front suspension system according to claim 10 wherein:
a sway bar is mounted in bushings on said chassis and extends to either side of said chassis with opposite ends of the sway bar attached to a respective A-frame, whereby vertical movement of one ski is translated to the other ski.

12. A front suspension system according to claim 11 wherein:
said snowmobile chassis includes a steering linkage system for interconnecting the spindles of said suspension system to thereby coordinate steering of the skis.

13. A front suspension system according to claim 12 wherein:
a pair of shock absorbers are attached at spaced locations on said chassis and a free end of each shock absorber is attached to one of said upper and said lower A-frames for dampening vertical movement of the skis relative to the chassis and for the transference of weight from the chassis to the ski.

14. A front suspension system for a snowmobile, the suspension system having a pair of steerable skis for supporting a front end of a snowmobile, each ski having a bottom surface and being pivotably attached on a generally horizontal axis transverse to its length to an end of a respective spindle arrangement by a generally horizontally disposed hinge pin, said snowmobile having a longitudinal axis and a chassis connected to a spindle arrangement for each ski by upper and lower suspension linkages, and a spindle arrangement interconnecting respective skis and suspension linkages, each spindle arrangement angled forwardly and downwardly in an forward direction of travel of the snowmobile, said upper and lower suspension linkages being of predetermined dimensions, each said spindle arrangement having a longitudinal axis which when projected downwardly to the bottom of the respective ski establishes a steering point, respective upper suspension linkages connected to each said spindle arrangement at a predetermined location near an upper end thereof establishing a predetermined distance between the predetermined location of the attachment of the upper suspension linkage and the steering point, respective lower suspension linkages connected to each said spindle arrangement at a predetermined location, wherein each spindle, the chassis, and respective upper and lower suspension linkages form parallelogramic linkages which move each respective steering point substantially parallel to a vertical plane containing the longitudinal axis of the snowmobile during deflection of the front suspension.

* * * * *